US011373677B2

(12) United States Patent
Namihisa et al.

(10) Patent No.: US 11,373,677 B2
(45) Date of Patent: Jun. 28, 2022

(54) DOUBLE BEND VCM YOKE STRUCTURE

(71) Applicant: Western Digital Technologies, Inc., San Jose, CA (US)

(72) Inventors: Miki Namihisa, Kanagawa (JP); Kouki Uefune, Kanagawa (JP); Toshio Takahashi, Tokyo (JP); Yuichi Arai, Kanagawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/994,472

(22) Filed: Aug. 14, 2020

(65) Prior Publication Data
US 2021/0407545 A1 Dec. 30, 2021

Related U.S. Application Data

(60) Provisional application No. 63/045,669, filed on Jun. 29, 2020.

(51) Int. Cl.
G11B 5/55 (2006.01)
G11B 5/584 (2006.01)
H02K 41/035 (2006.01)
G11B 15/46 (2006.01)

(52) U.S. Cl.
CPC ............ G11B 5/5504 (2013.01); G11B 5/584 (2013.01); H02K 41/0356 (2013.01); G11B 15/46 (2013.01)

(58) Field of Classification Search
None
See application file for complete search history.

(56) References Cited

U.S. PATENT DOCUMENTS

| 5,523,911 | A | * | 6/1996 | Mita et al. | ........... | G11B 5/5521 |
| | | | | | | 360/264.7 |
| 5,585,679 | A | * | 12/1996 | Bracken et al. | ... | H02K 41/0358 |
| | | | | | | 360/264.8 |
| 5,726,834 | A | | 3/1998 | Eckberg et al. | | |
| 6,462,914 | B1 | * | 10/2002 | Oveyssi et al. | ...... | G11B 5/5521 |
| | | | | | | 360/264.8 |

(Continued)

FOREIGN PATENT DOCUMENTS

| JP | 2002223554 A | 8/2002 |
| JP | 2003059020 A | 2/2003 |
| JP | 2006012223 A | 1/2006 |

OTHER PUBLICATIONS

Eleftheriou et al,; "Control Technologies for Emerging Micro and Nanoscale Systems" Springer, LNCIS 413, 2011 (300 pages).

Primary Examiner — Craig A. Renner
(74) Attorney, Agent, or Firm — Patterson + Sheridan, LLP; Steven H. VerSteeg

(57) ABSTRACT

The present disclosure generally relates to a voice coil motor (VCM) yoke for a data storage device. The VCM yoke has a unitary body turned back on itself at opposite ends to form a "C" shape. The unitary body is electrically conductive. The body has a substantially flat inner surface upon which the coil is disposed. The unitary body also has a substantially flat top and a substantially flat bottom surface. A coil is disposed within the turns of the unitary body. The VCM yoke can be coupled to an actuator block using one or more fastening mechanisms that extend through openings in the VCM yoke.

20 Claims, 16 Drawing Sheets

(56) References Cited

U.S. PATENT DOCUMENTS

| | | | |
|---|---|---|---|
| 6,498,706 B1* | 12/2002 | Takekawa et al. ...... | G11B 5/56 360/264.5 |
| 6,529,351 B1* | 3/2003 | Oveyssi et al. ...... | G11B 5/5521 360/264.8 |
| 7,161,768 B1* | 1/2007 | Oveyssi ............... | G11B 5/5569 360/264.8 |
| 7,327,537 B1* | 2/2008 | Oveyssi ............... | G11B 5/5569 360/264.7 |
| 7,372,670 B1* | 5/2008 | Oveyssi ............... | G11B 5/5569 360/264.7 |
| 7,375,929 B1* | 5/2008 | Chang et al. ........ | G11B 5/4833 360/265.8 |
| 2002/0036867 A1* | 3/2002 | Hong et al. .......... | G11B 5/5569 360/264.7 |
| 2002/0080531 A1 | 6/2002 | Inoguchi et al. | |
| 2003/0197980 A1* | 10/2003 | Hong et al. .......... | G11B 5/5569 360/264.7 |
| 2004/0184195 A1 | 9/2004 | Nayak et al. | |
| 2005/0174698 A1* | 8/2005 | Matsuda et al. ..... | G11B 5/5569 360/264.7 |
| 2007/0053110 A1 | 3/2007 | Harper | |
| 2007/0285845 A1 | 12/2007 | Nayak et al. | |
| 2009/0116140 A1* | 5/2009 | Harper .................. | G11B 5/584 360/77.12 |

* cited by examiner

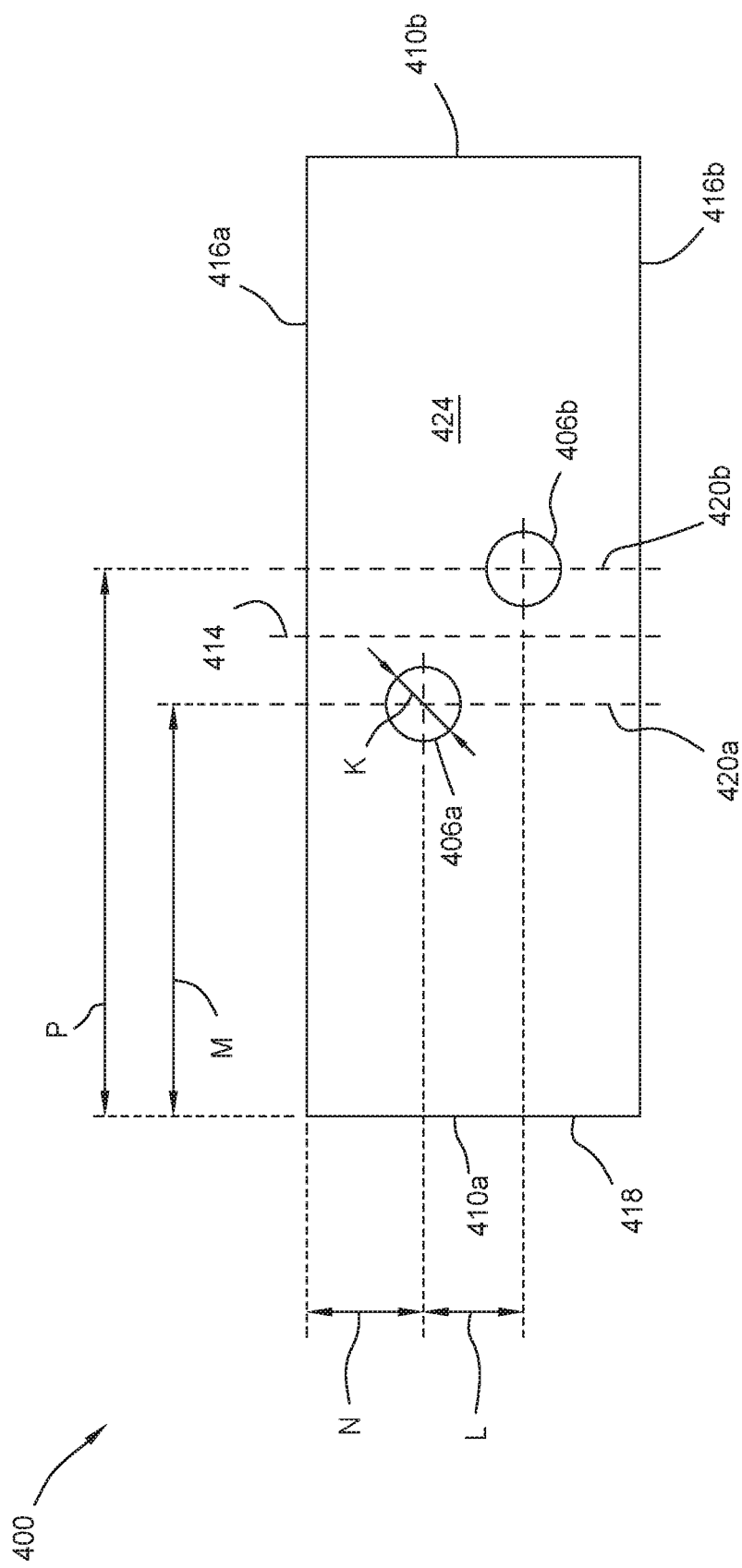

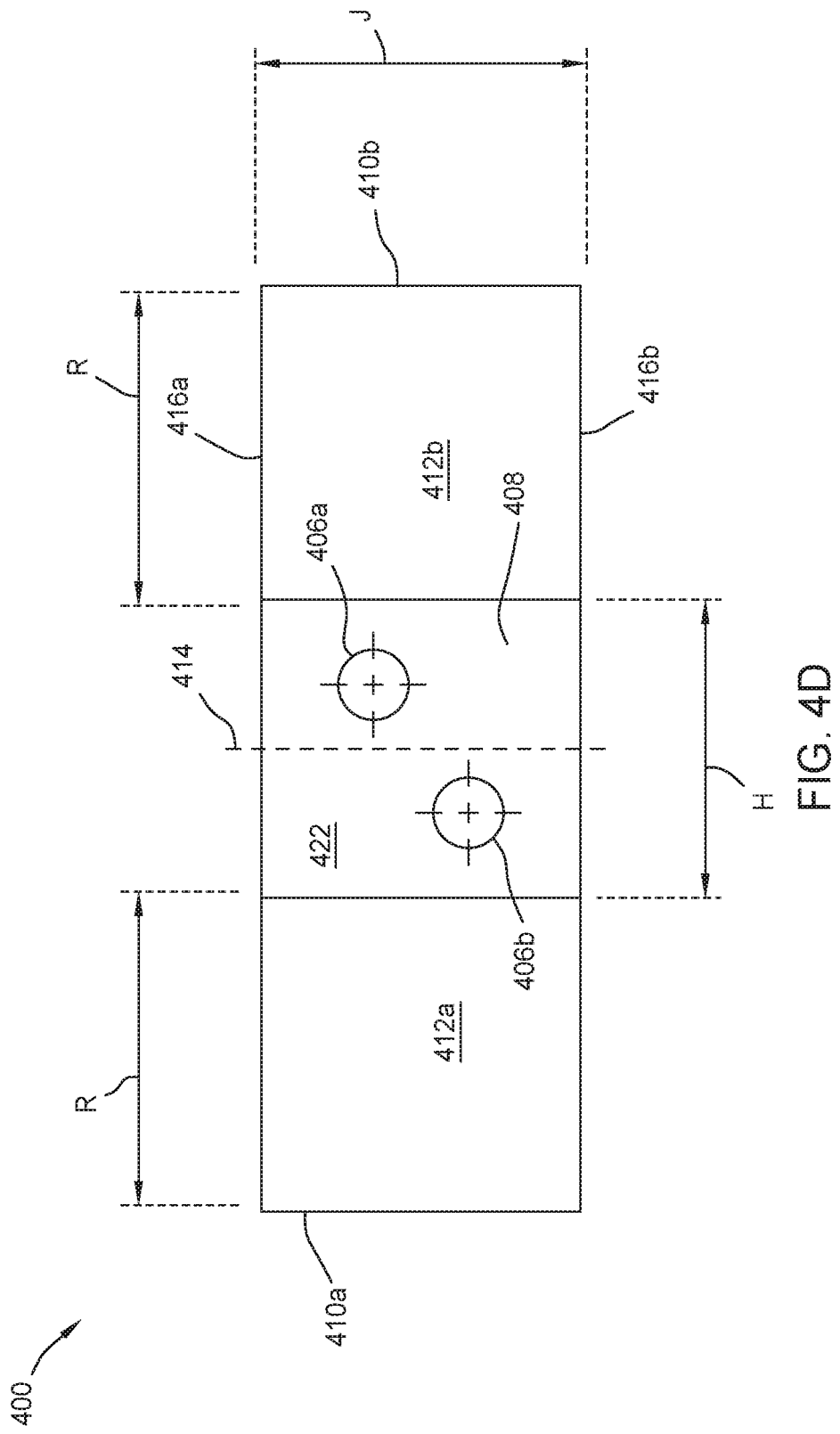

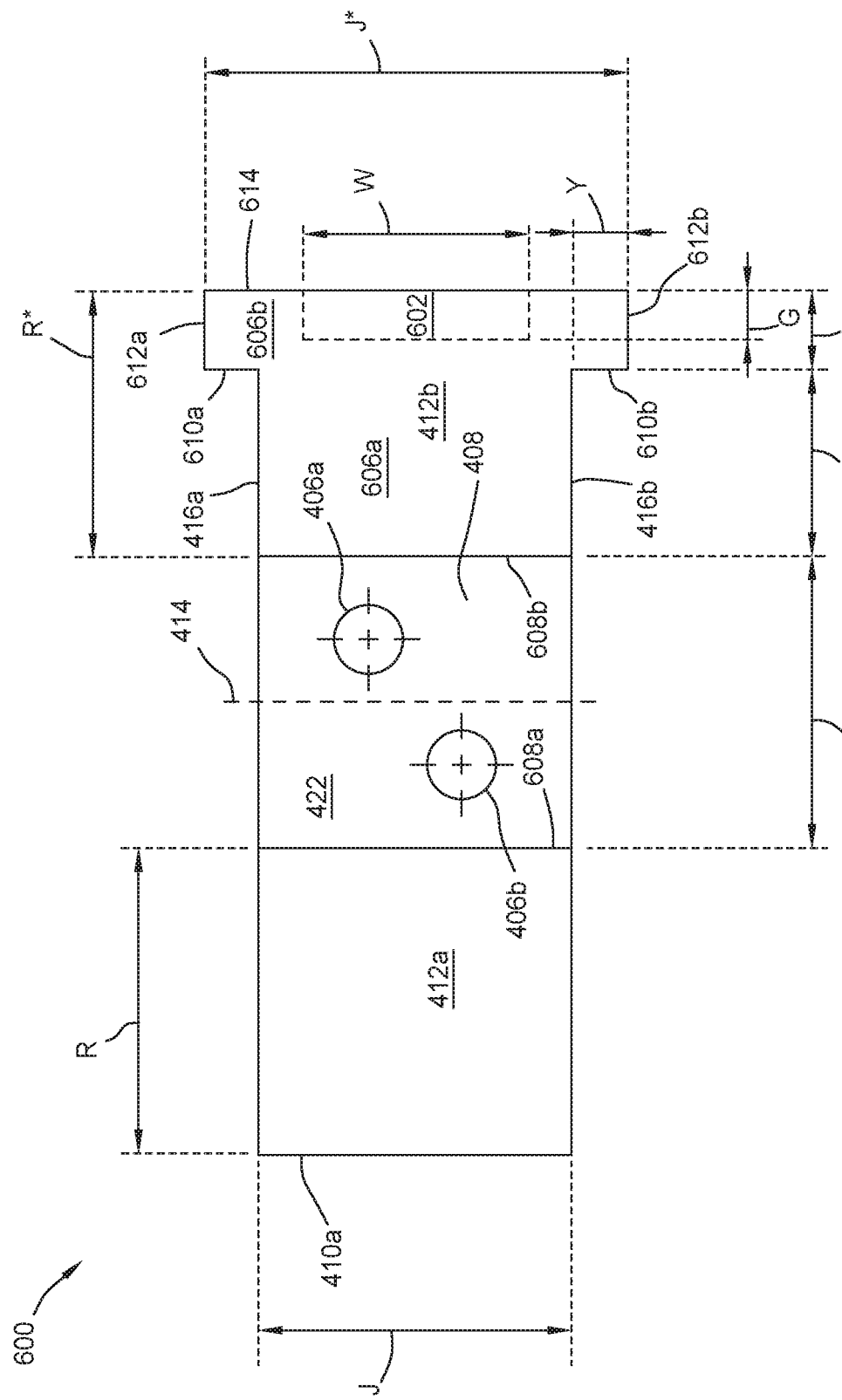

DOUBLE BEND VCM YOKE STRUCTURE

CROSS-REFERENCE TO RELATED APPLICATIONS

This application claims benefit of U.S. Provisional Patent Application Ser. No. 63/045,669, filed Jun. 29, 2020, which is herein incorporated by reference.

BACKGROUND OF THE DISCLOSURE

Field of the Disclosure

Embodiments of the present disclosure generally relate to a voice coil motor (VCM) yoke for a data storage device.

Description of the Related Art

There are numerous types of data storage devices including hard disk drives (HDD), solid state drives (SSD), and tape drives to name just a few. Tape drives are tape data storage systems for storing digital information on magnetic tape using digital recording. Tape drives are more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head comprises servo elements and data elements that are arranged in an array that is oftentimes referred to as a tape head array.

Both tape drives and HDDs utilize VCMs. VCMs are the simplest type of electric motors and typically comprise two parts, a magnetic housing and a coil. Applying a voltage across the terminals of the VCM causes the motor to move. As industry seeks to improve data storage density in both HDDs and tape drives without increasing the footprint of the HDD or tape drive, simply shrinking the components of the HDD or tape drive while increasing the size of the storage media simply will not work without some creative engineering solutions.

Therefore, there is a need in the art for an improved VCM yoke for data storage devices to accommodate changing space allocations.

SUMMARY OF THE DISCLOSURE

The present disclosure generally relates to a voice coil motor (VCM) yoke for a data storage device. The VCM yoke has a unitary body turned back on itself at opposite ends to form a "C" shape. The unitary body is electrically conductive. The body has a substantially flat inner surface upon which the coil is disposed. The unitary body also has a substantially flat top and a substantially flat bottom surface. A coil is disposed within the turns of the unitary body. The VCM yoke can be coupled to an actuator block using one or more fastening mechanisms that extend through openings in the VCM yoke.

In one embodiment, a voice coil motor (VCM) yoke assembly comprises: a unitary body including a backbone portion, a first arm portion coupled to the backbone portion, a first hand portion coupled to the first arm portion, a second arm portion coupled to the backbone portion, and a second hand portion coupled to the second arm portion, wherein the backbone portion has one or more openings formed therethrough, wherein the first arm portion extends substantially perpendicular from the backbone portion, wherein the first hand portion extends substantially perpendicular from the first arm portion, wherein the second arm portion is substantially parallel to the first arm portion, and wherein the second hand portion is substantially parallel to the first hand portion; and a plurality of magnets coupled to the unitary body.

In another embodiment, a voice coil motor (VCM) yoke assembly comprises: a unitary body having a "C" shape when viewed from a top view; and a plurality of magnets coupled to the unitary body.

In another embodiment, a voice coil motor (VCM) yoke assembly comprises: a unitary body having four bends, wherein the four bends are all in a same direction, wherein ends of the unitary body are aligned in a common plane when viewed from a top view, and wherein the ends of the unitary body are spaced apart by an end distance; and at least four magnets coupled to the unitary body, wherein a first magnet and a second magnet of the at least four magnets are linearly aligned when viewed from the top view, wherein a third magnet and a fourth magnet of the at least four magnets are linearly aligned when viewed from the top view, wherein the first magnet and the third magnet are linearly aligned when viewed from the top view, wherein the second magnet and the fourth magnet at linearly aligned when viewed from the top view, wherein the first magnet is spaced from the second magnet by a first distance, wherein the third magnet and the fourth magnet are spaced apart by a second distance, wherein the second distance is substantially equal to the first distance and the end distance.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4D are schematic illustrations of a VCM yoke according to one embodiment.

FIGS. 6A-6D are schematic illustrations of a VCM yoke according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a voice coil motor (VCM) yoke for a data storage device. The VCM yoke has a unitary body turned back on itself at opposite ends to form a "C" shape. The unitary body is electrically conductive. The body has a substantially flat inner surface upon which the coil is disposed. The unitary body also has a substantially flat top and a substantially flat bottom surface. A coil is disposed within the turns of the unitary body. The VCM yoke can be coupled to an actuator block using one or more fastening mechanisms that extend through openings in the VCM yoke.

Figure 1A:
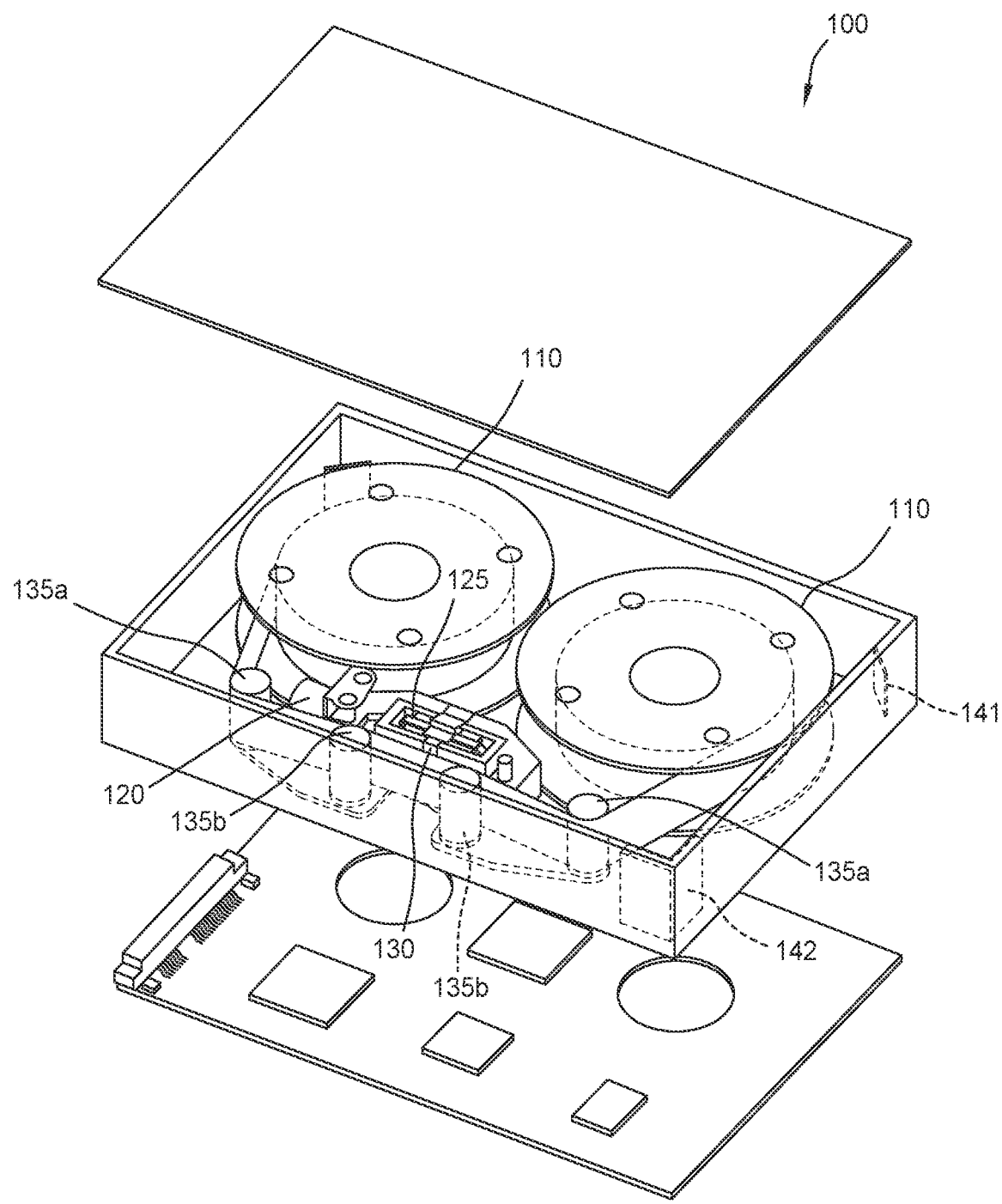
FIGS. 1A-1C illustrate a perspective exploded view and a simplified top down and side profile view of a tape embedded drive, in accordance with some embodiments.
Figure 1B:
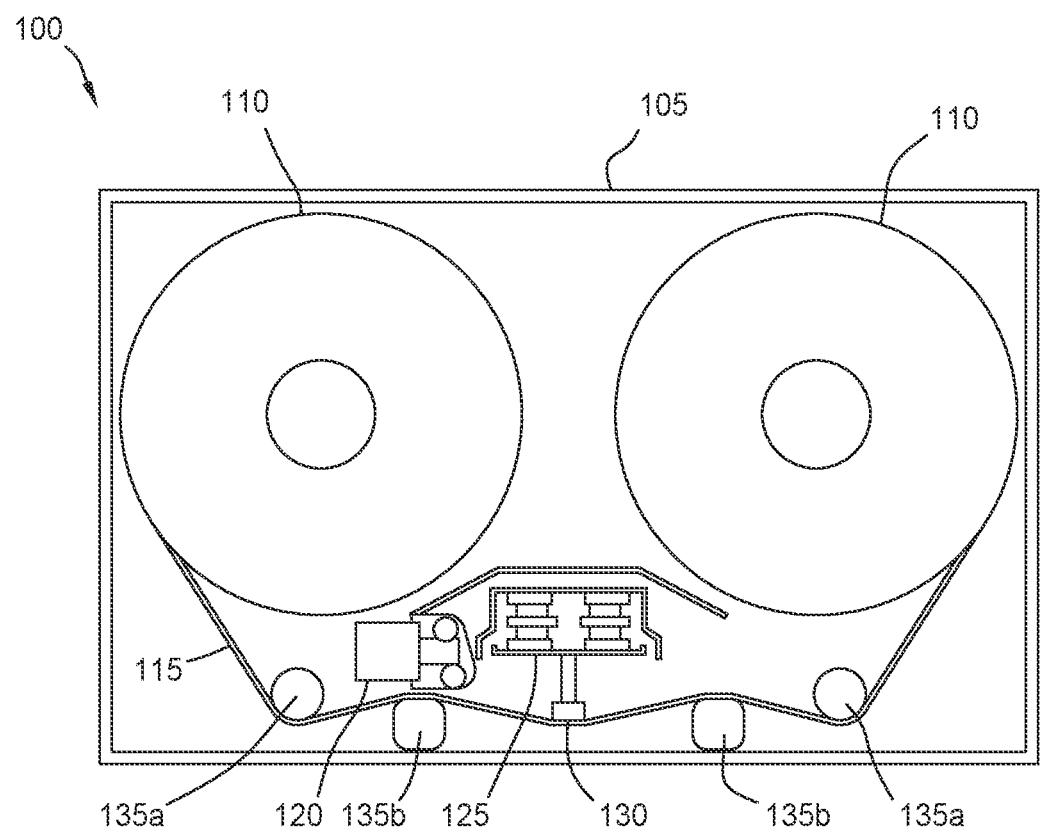
Figure 1C:
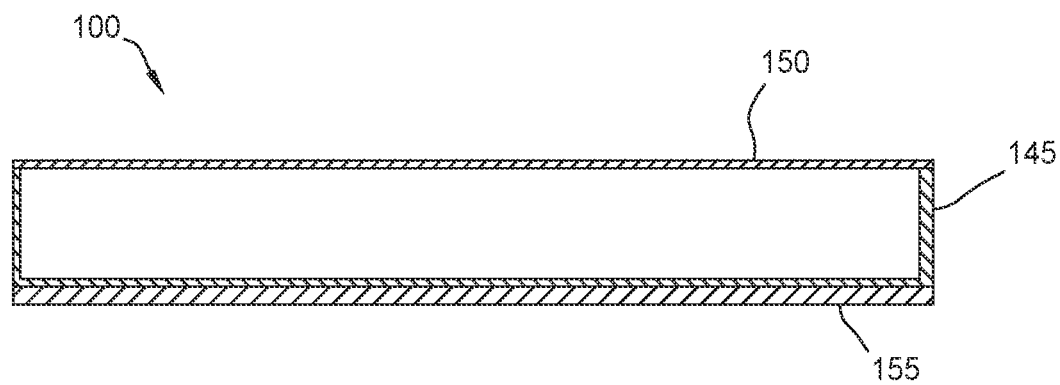

FIGS. 1A-1C illustrate a perspective exploded view and a simplified top down and side profile view of a tape embedded drive, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A.

In the illustrated embodiments, two tape reels 110 are placed in the interior cavity of the casing, with the center of the two tape reels on the same level in the cavity and with the head assembly 130 located in the middle and below the two tape reels. Tape reel motors located in the spindles of the tape reels can operate to wind and unwind the tape media 115 in the tape reels 110. Each tape reel 110 may also incorporate a tape folder to help the tape media 115 be neatly wound onto the reel 110. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 serving to press the tape media 115 against the head assembly 130.

As shown in FIG. 1A, in some embodiments, the guides/rollers 135, 135b utilize the same structure. In other embodiments, as shown in FIG. 1B, the guides/rollers 135a, 135b may have more specialized shapes and differ from each other based on function. Furthermore, a lesser or a greater number of rollers 135a, 135b may be used. For example, the two functional rollers 135a, 135b may be cylindrical in shape, while the two functional guides 135a, 135b may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media 115 to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels 110 may generate internal airflow as the tape media 115 winds/unwinds, and the particle filters 141 may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so the PCBA 155 does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive 100 may be beneficial for tape film winding stability, tape film reliability, and tape head reliability. Desiccant 142 may be used to limit humidity inside the casing.

In one embodiment, the cover 150 is used to hermetically seal the tape embedded drive 100. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive 100. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
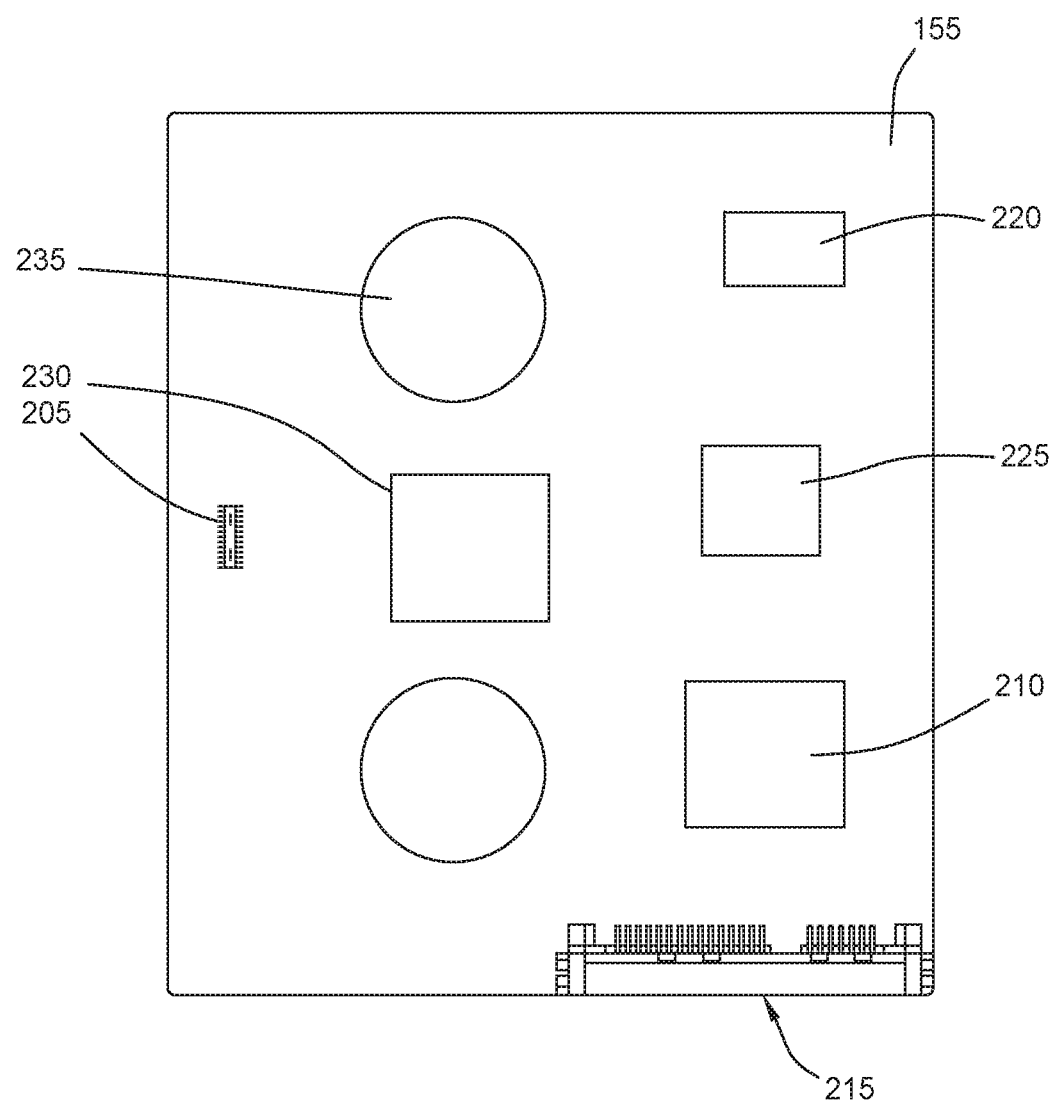
FIG. 2 illustrates a top perspective view of a printed circuit board assembly (PCBA) of the tape embedded drive, in accordance with some embodiments.

FIG. 2 illustrates a top perspective view of a printed circuit board assembly (PCBA) 155 of the tape embedded drive 100, in accordance with some embodiments. The PCBA 155 of the tape embedded drive 100 may be the PCBA 155 of FIG. 1. The PCBA 155 is attached to the bottom surface of the casing, with a connector 205 attaching to contacts or an interface on the bottom surface electrically/electronically connected to internal components in the casing. For example, the contacts or interface may be electrically connected to one or more motors and/or actuators within the casing. In one embodiment, the contacts/interface are built into the casing without comprising an air tight seal of the casing. In some embodiments, the connector 205 may be an electrical feed-through electrically connecting components inside the casing to those on the PCBA, while maintaining sealing of the casing.

The PCBA 155 can include various components, such as one or more controllers, one or more connectors 205, a system on a chip (SoC) 210, one or more data interfaces 215 (e.g., Serial ATA (SATA), Serial Attached SCSI (SAS), non-volatile memory express (NVMe), or the like), a memory 220, a Power Large Scale Integration (PLSI) 225, and/or data read channel controller 230. One or more cutouts 235 can be added in the PCBA 155 to provide additional space for tape reel motors, if needed. For example, the portion of the casing above the tape reel motors may be raised to provide additional space for the motors. By providing cutouts 235, the thickness of the tape embedded drive 100 may be reduced as the PCBA 155 may surround the raised portion of the casing.

The PCBA 155 may extend along the entire bottom exterior surface of the casing 105 or may only partially extend along the surface, depending on how much space the various components need. In some embodiments, a second PCBA 155 may be located internally in the casing 105 and be in communication with the first PCBA 155, for example, via the connector 205.

In some embodiments, a controller on the PCBA 155 controls the read and write operations of the tape embedded drive 100. The controller may engage the tape spool motors and cause the tape spools to wind the tape film forwards or backwards. The controller may use the stepping motor and the voice coil motor to control placement of the head(s) over the tape film. The controller may also control output/input of data to or from the tape embedded drive 100 through the one or more interfaces 215, such as SATA or SAS.

Figure 3:
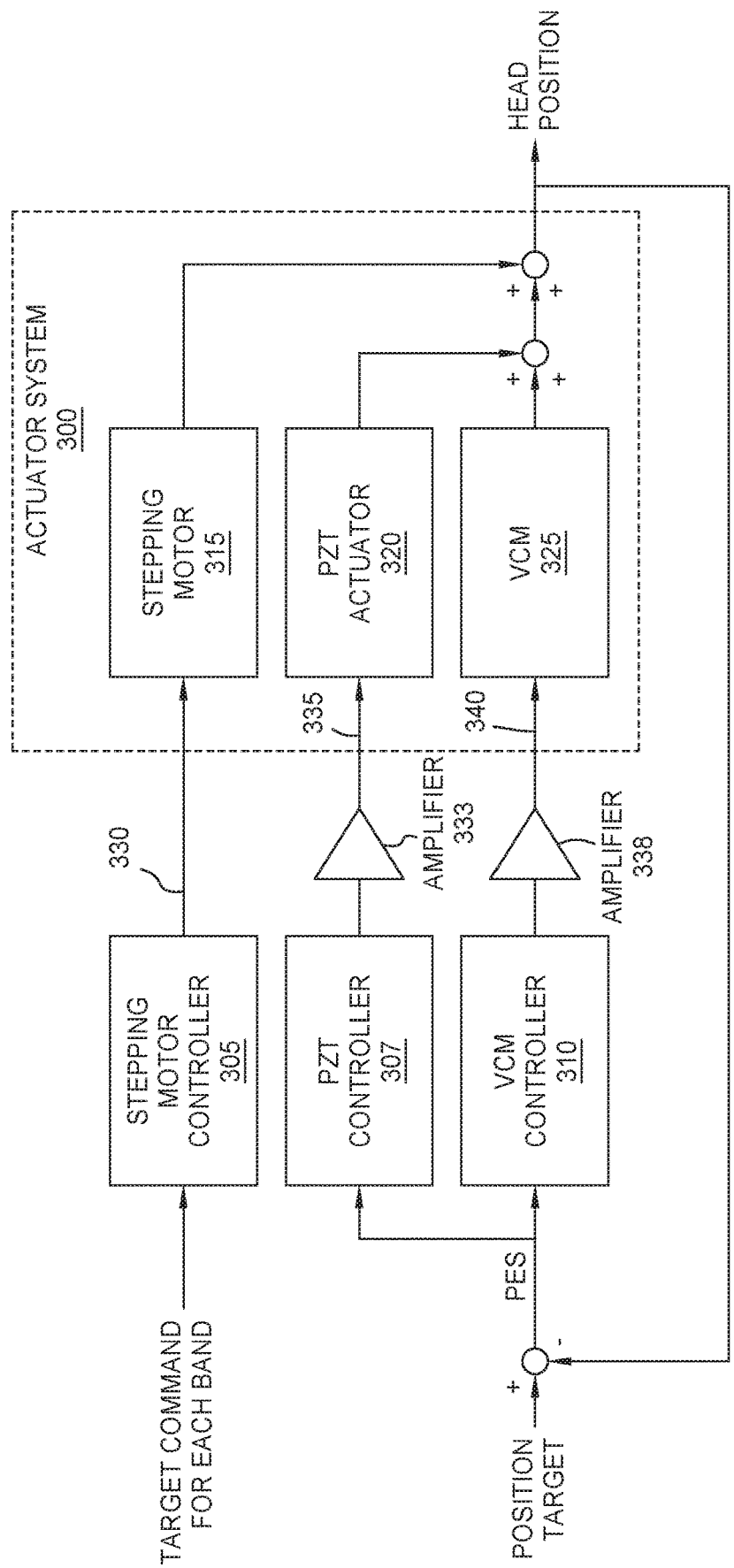
FIG. 3 illustrates a control block diagram for a servo-mechanical system of the tape embedded drive, in accordance with some embodiments.

FIG. 3 illustrates a control block diagram for a servo-mechanical system 300 of the tape embedded drive 100, in accordance with some embodiments. The control logic for the system 300 may be implemented as a process in one or more controllers of the tape embedded drive 100, such as the SoC and/or PLSI in the PCBA and used to control one or more motors and/or one or more actuators.

In an embodiment, a stepping motor controller 305, a PZT controller 307, and a VCM controller 310 work together to control a stepping motor 315, a PZT actuator 320, and a VCM 325 to coordinate the movement of the head(s) in response to a target command.

As discussed above, the stepping motor 315 may provide coarse movement, the VCM 325 may provide fine movement, and the PZT actuator 320 may provide very fine movement. For example, assuming a 12.65 mm tape width, the stepping motor stroke may be about 12.65 mm, with the VCM stroke at about 4 mm, and the PZT stroke at about 4 µm. In this embodiment, the various strokes creates a movement ratio of about 30,000:10,000:1 (stepping motor: VCM:PZT actuator). In other embodiments, the ratios may be different based on the performance specifications of the motors and the actuators.

A first control signal 330 is sent from the stepping motor controller to the stepping motor 315. The head(s) are then moved in a coarse movement. In an embodiment, a head position sensor detects the position of the head(s) after the first movement and provides a positive error signal (PES) to the VCM and PZT controllers. In response, the VCM and the PZT controllers may further move the head(s) in a fine and a very fine movement, respectively, if needed, to place the head(s) into the desired position.

A first amplifier 333 may be positioned in between the PZT controller 307 and the PZT actuator 320 to amplify a second control signal 335. A second amplifier 338 may be positioned in between the VCM controller 310 and the VCM 325 to amplify a third control signal 340.

In an embodiment, the PZT actuator 320 and the VCM 325 move the head(s) serially. The VCM 325 first moves the head(s) and then, if the head(s) are within a first threshold distance from the target position, the PZT actuator 320 may take over the movement of the head(s) for very fine movements. In another embodiment, the PZT actuator 320 and the VCM 325 may move the head(s) in parallel. It should be noted that although PZT is used throughout in the description of the control system of FIG. 3, as disclosed above, other types of actuators may be used in place of PZTs, and the system of FIG. 3 may be adapted accordingly in other embodiments.

Figure 4A:
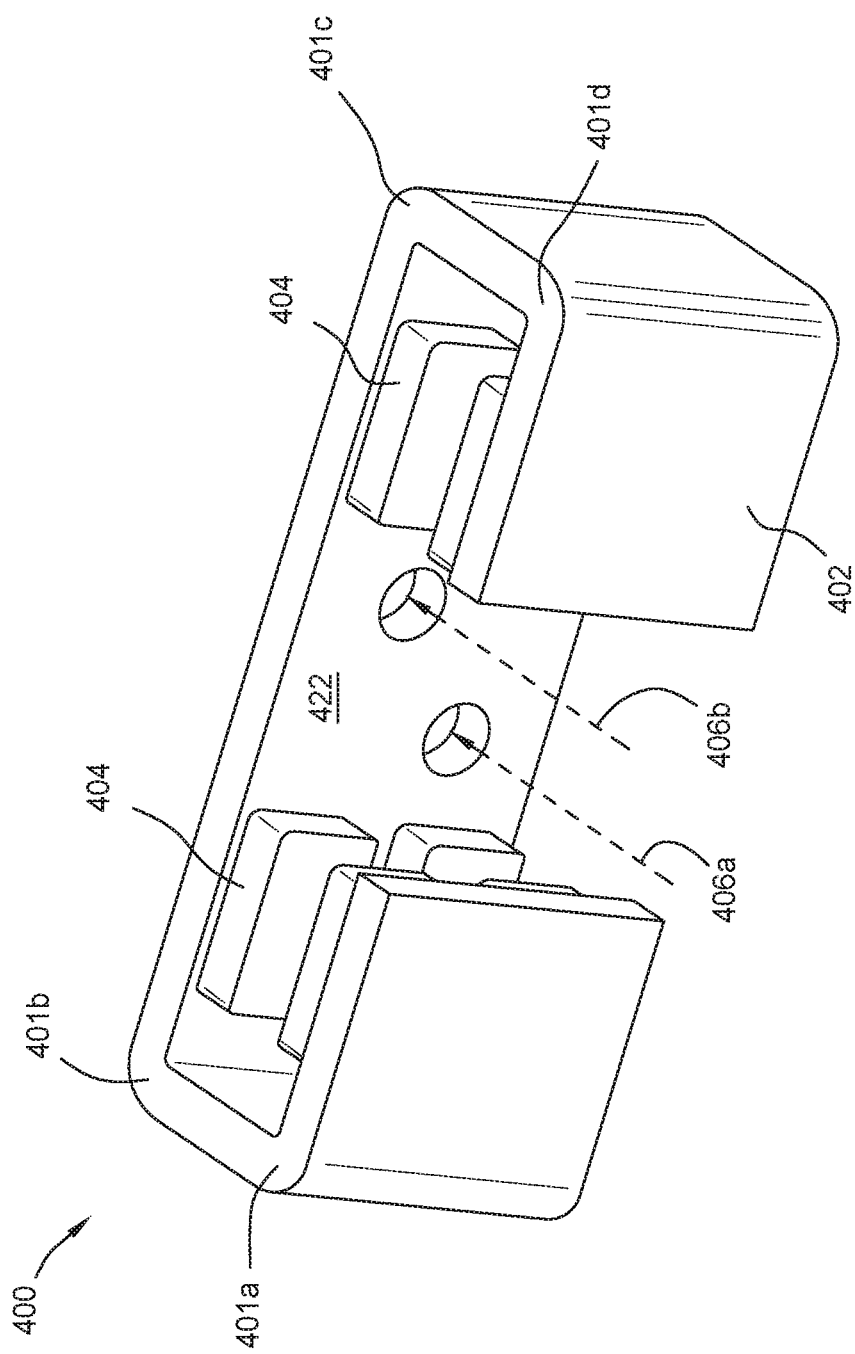

FIG. 4A illustrates a VCM yoke 400 that includes a unitary body 402 with one or more openings 406a, 406b. The VCM yoke 400 further includes a plurality of magnets 404 coupled to the unitary body 402. The unitary body 402 of the VCM yoke 400 is designed to be coupled to an actuator block of the VCM, such as the VCM 125 of FIG. 1, by a coupling mechanism, such as a screw, utilizing the one or more openings 406a, 406b. It is to be understood that while the openings 406a, 406b are shown to be offset one opening closer to the bottom surface as compared to the other opening, the opening positions can be reversed. Furthermore, it is contemplated that the openings 406a, 406b need not be offset, but rather, can be aligned along a plane that is substantially parallel to the bottom surface of the unitary body 402 or vertically aligned along a plan substantially perpendicular to the bottom surface of the unitary body 402. Additionally, it is to be understood that while two openings 406a, 406b are shown, a single opening, as well as more than two openings, is contemplated. Furthermore, while the two openings 406a, 406b are shown to be substantially identical, it is contemplated that the openings 406a, 406b can be different. Additionally, the unitary body 402 is understood to be a continuous piece of material extending from one end of the body (i.e., end of one hand portion 412a) to another end (i.e., end of other hand portion 412b) of the body. The unitary body may have multiple layers of material, but be unitary because at least one layer of the multiple layers extends continuously from one end of the body to another end of the body. Furthermore, it is also contemplated that the unitary body may comprise multiple pieces welded together to form a unitary body.

The VCM yoke 400 aids in the movement of a head assembly, such as the head assembly 130 of FIG. 1, when a current passes through a VCM coil of the VCM and interacts with the magnetic field of the plurality of magnets 404 coupled to the unitary body 402. The plurality of magnets 404 may be coupled to the unitary body 402 in a pattern, such as the pattern illustrated in FIG. 4A. The illustrated pattern is not intended to be limiting, but to provide an example of a potential embodiment.

The plurality of magnets 404 may include a material selected from the group that includes nickel (Ni), iron (Fe), cobalt (Co), and alloys thereof. Additionally, it is to be understood that while Ni, Fe, and Co have been exemplified as the plurality of magnets 404 materials, other ferromagnetic materials are contemplated and the embodiments herein are not limited to Ni, Fe, or Co for the plurality of magnets 404. The one or more magnets 404a, 404b, 404c, 404d may collectively be referred to as a plurality of magnets 404.

The unitary body 402 may include a material selected from the group that includes nickel (Ni), iron (Fe), cobalt (Co), and alloys thereof. Additionally, it is to be understood that while Ni, Fe, and Co have been exemplified as the unitary body 402 materials, other ferromagnetic materials are contemplated and the embodiments herein are not limited to Ni, Fe, or Co for the unitary body 402.

The unitary body 402 may be formed from a single strip of the materials previously mentioned. The single strip may be bent in a first location 401a, a second location 401b, a third location 401c, and a fourth location 401d. Each bend may be at an angle of about 90°, where each bend is in the same direction (i.e., turns in on itself), and the resulting single strip forms a unitary body 402 in the shape of a "C". The "C" shaped structure has a double bend for each end of the unitary body 402. Furthermore, the distance between the first location 401a and the second location 401b is equal to the distance between the third location 401c and the fourth location 401d, where a line connecting the first location 401a to the second location 401b is parallel to a line connecting the third location 401c and the fourth location 401d. The distance between the first location 401a and the fourth location 401d is equal to the distance between the second location 401b and the third location 401c, where a line connecting the first location 401a to the fourth location 401d is parallel to a line connecting the second location 401b and the third location 401c.

Figure 4B:
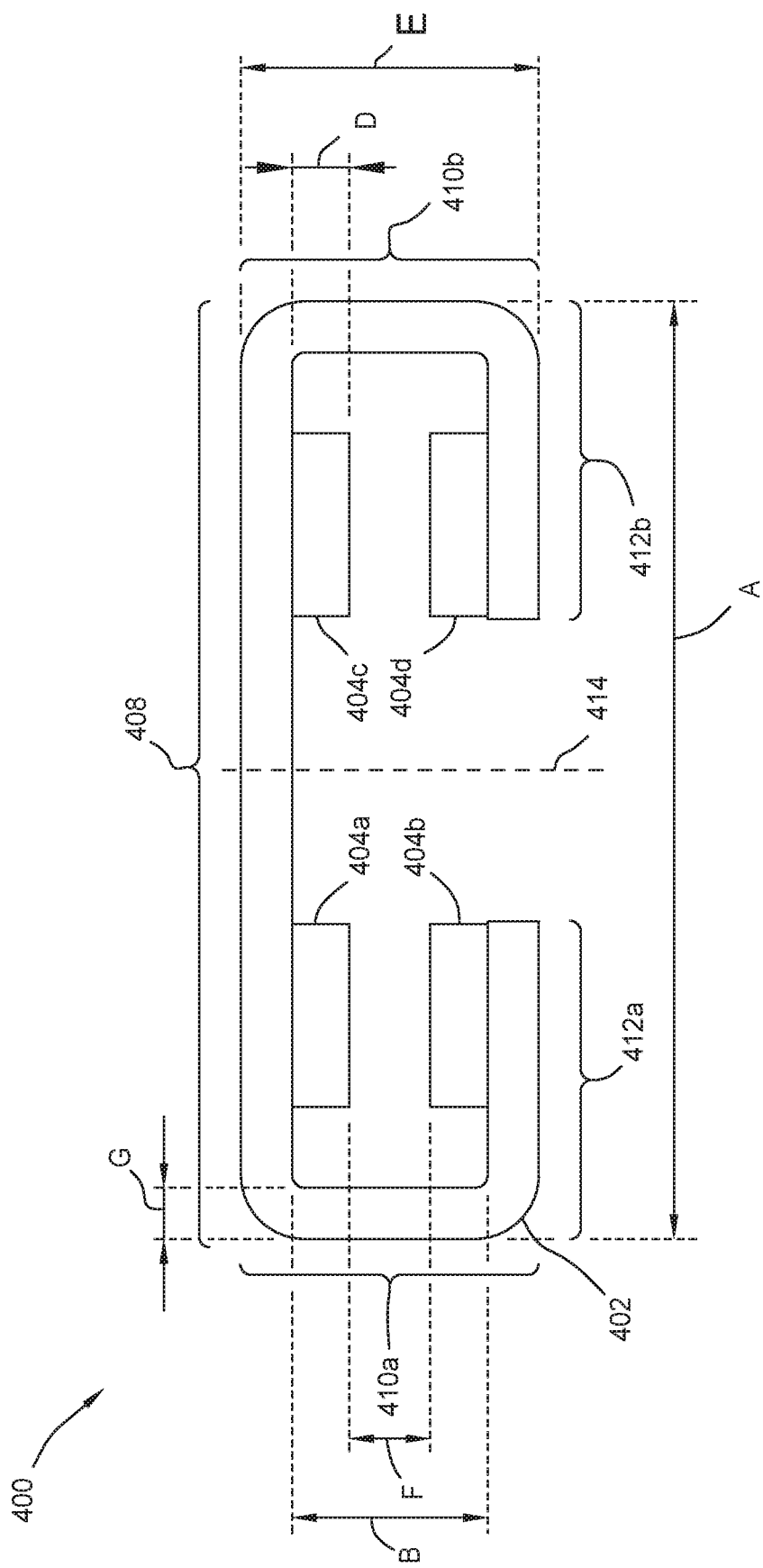

FIG. 4B illustrates a side view of the VCM yoke 400 that includes the unitary body 402 that includes the one or more magnets 404a, 404b, 404c, 404d. It is to be understood that while four magnets 404a-404d have been illustrated, the disclosure is not limited to four magnets 404a-404d. Rather, any number of magnets 404a-404d may be utilized with the caveat that the number of magnets 404a-404d on each side of the centerline 414 be equal to ensure a balanced magnetic field. The unitary body 402 includes a backbone portion 408, a first arm portion 410a coupled to the backbone portion 408, and a first hand portion 412a coupled to the first arm portion 410a. The unitary body 402 further includes a second arm portion 410b coupled to the backbone portion 408 and a second hand portion 412b coupled to the second arm portion 410b. The backbone portion 408 includes a top surface, a bottom surface, a front surface coupled between the top surface and the bottom surface, and a back surface coupled between the top surface and the bottom surface. The front surface and the back surface are on opposite sides of each other and connected to the top surface and the bottom surface. A hypothetical line 414 is located at the midpoint of the backbone portion 408 and is parallel to the first arm portion 410a and the second arm portion 410b.

The backbone portion 408 has a length "A" of between about 32 mm and about 35 mm. The front surface of the backbone portion 408 is spaced from the first hand portion 412a and the second hand portion 412b by a distance "B" of between about 6 mm and about 8 mm. The magnets 404a, 404b, 404c, 404d have a thickness "D" of between about 1.5 mm and about 2.25 mm. Both the first arm portion 410a and the second arm portion 410b have a length "E" of between about 10 mm and about 12 mm. The magnets 404a, 404c on the backbone portion 408 are spaced from the magnets 404b, 404d on the first hand 412a and second hand 412b by a distance "F" of between about 2 mm and about 3 mm. The unitary body 402 has a thickness "G" of between about 1.5 mm and about 2.5 mm.

The backbone portion 408 includes the first magnet 404a, and the first hand portion 412a includes a second magnet 404b. Furthermore, the backbone portion 408 includes a third magnet 404c and the second hand portion 412b includes a fourth magnet 404d. Though four magnets 404a, 404b, 404c, 404d are illustrated, more than one magnet may be shown in line (i.e., into the page or out of the page) with the one or more magnets 404a, 404b, 404c, 404d illustrated. In one embodiment, the plurality of magnets 404 includes eight magnets. The number of magnets 404 listed is not intended to be limiting, but to provide an example of a possible embodiment.

The first magnet 404a and the third magnet 404c are equally spaced away from a theoretical line 414 that intersects the midpoint of the backbone portion 408, where the theoretical line 414 is parallel with the first arm portion 410a and the second arm portion 410b. Furthermore, the second magnet 404b and the fourth magnet 404d are equally spaced away from the theoretical line 414, where the distance between the first magnet 404a and the third magnet 404c is equal to the distance between the second magnet 404b and the fourth magnet 404d.

FIG. 4C illustrates a view of a back surface of the backbone portion 408 of the unitary body 402 of the VCM yoke 400 that includes a first opening 406a and a second opening 406b. FIG. 4D illustrates a view of the front surface of the backbone portion 408, the first hand portion 412a, and the second hand portion 412b of the unitary body 402 of the VCM yoke 400 that includes the first opening 406a and the second opening 406b.

The first hand portion 412a is spaced away from the second hand portion 412b by a distance "H" of between about 10 mm and about 11 mm. Furthermore, the height of the unitary body 402 (i.e., the distance "J" between the top edge 416a and the bottom edge 416b) is between about 11 mm and about 12 mm.

The first opening 406a and the second opening 406b each has a diameter "K" of between about 2 mm and about 3.5 mm. The first opening 406a and the second opening 406b extend from the back surface 424 of the backbone portion 408, illustrated in FIG. 4C, to the front surface 422 of the backbone portion 408, illustrated in FIG. 4D.

The first opening 406a is spaced a first distance from the theoretical line 414 and the second opening 406b is spaced a second distance from the theoretical line 414. The first distance and the second distance are equal. The centers of the first opening 406a and the second opening 406b are spaced apart by a distance "L" of between about 4 mm and about 5 mm, the distance "L" being in a direction parallel to the theoretical line 414.

The center of the first opening 406a is disposed a distance "M" from an edge 418 of the unitary body 402 of between about 14 mm and about 15 mm. The edge 418 of the unitary body 402 corresponds to an outside surface of the first arm portion 410a. The center of the first opening 406a is spaced a distance "N" from the top edge 416a of the unitary body 402 of between about 3 mm and about 4.5 mm. The center of the first opening 406a is closer to the top edge 416a than the bottom edge 416b.

The center of the second opening 406b is disposed a distance "P" from the edge 418 of the unitary body 402 of between about 18 mm and about 19 mm. The center of the second opening 406b is spaced from the top edge 416a by a distance equal to "L" plus "N" or between about 7 mm and about 9.5 mm. The center of the second opening 406b is closer to the bottom edge 416b of the unitary body 402 than the top edge 416a. As noted above, the ends 420a, 420b of the first hand portion 412a and the second hand portion 412b respectively are spaced apart by a distance "H". The first hand portion 412a and the second hand portion each has a length "R" of between about 11 mm and about 12 mm. The centers of the first opening 406a and the second opening 406b are spaced apart by a distance "P"–"M" of between about 3 mm and about 5 mm, the distance being in a direction perpendicular to the theoretical line 414.

Figure 5A:
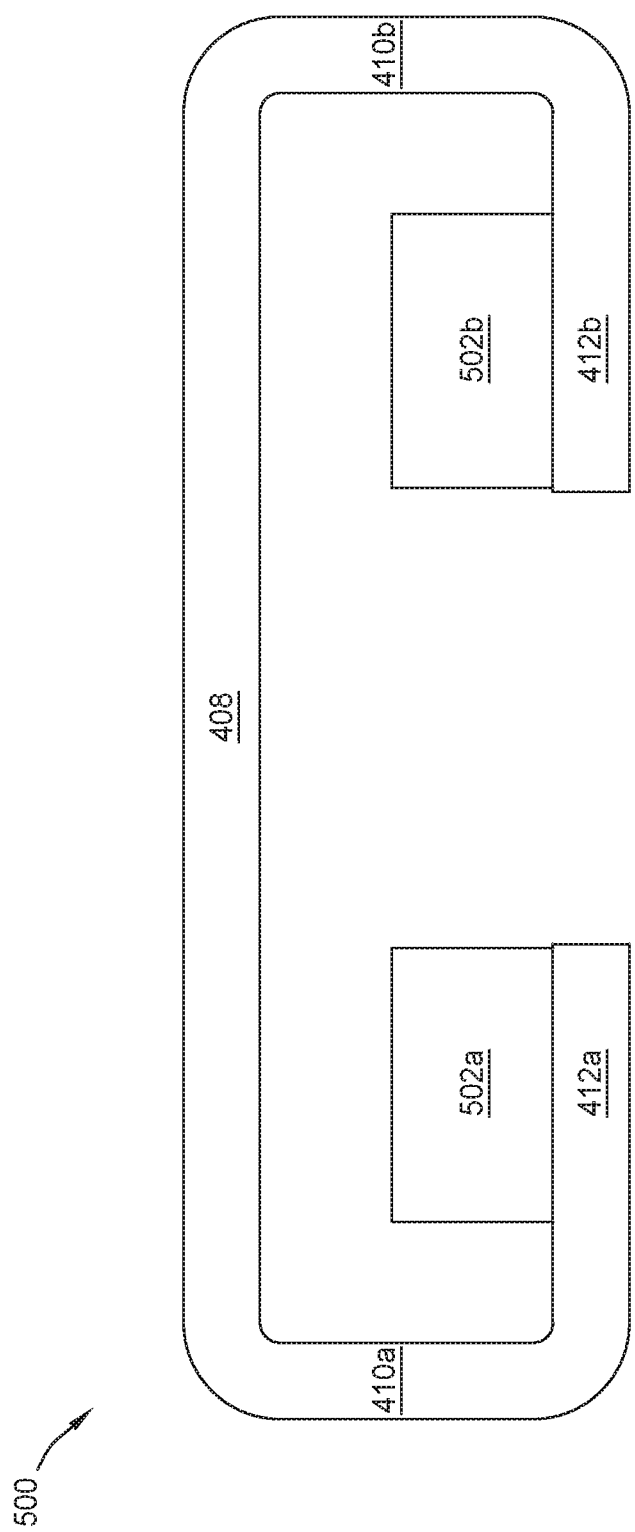
FIGS. 5A and 5B are schematic illustrations of a VCM yoke according to another embodiment.
Figure 5B:
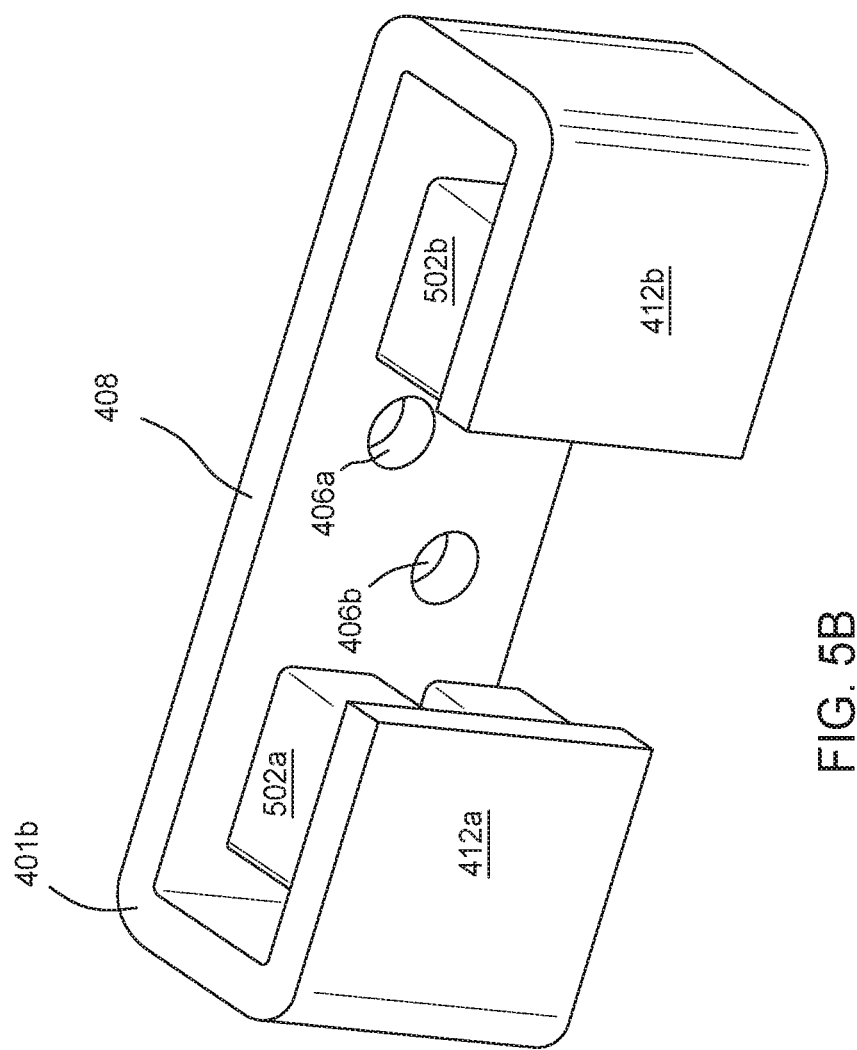

FIGS. 5A and 5B are schematic illustrations of a VCM yoke 500 according to another embodiment. In the embodiment of FIGS. 5A and 5B, rather than having magnets 404a-404d on the backbone portion 408 and the hand portions 412a, 412b, magnets 502a, 502b are disposed on either the hand portions 412a, 412b, the backbone portion 408, or a mixture thereof. Exemplified in FIGS. 5A and 5B is the embodiment where the magnets 502a, 502b are disposed on the hand portions 412a, 412b, but it is to be understood that rather than on the hand portions 412a, 412b, the magnets 502a, 502b may be on the backbone portion 408 or one magnet on the backbone portion 408 and one on either of the hand portions 412a, 412b.

Figure 6A:
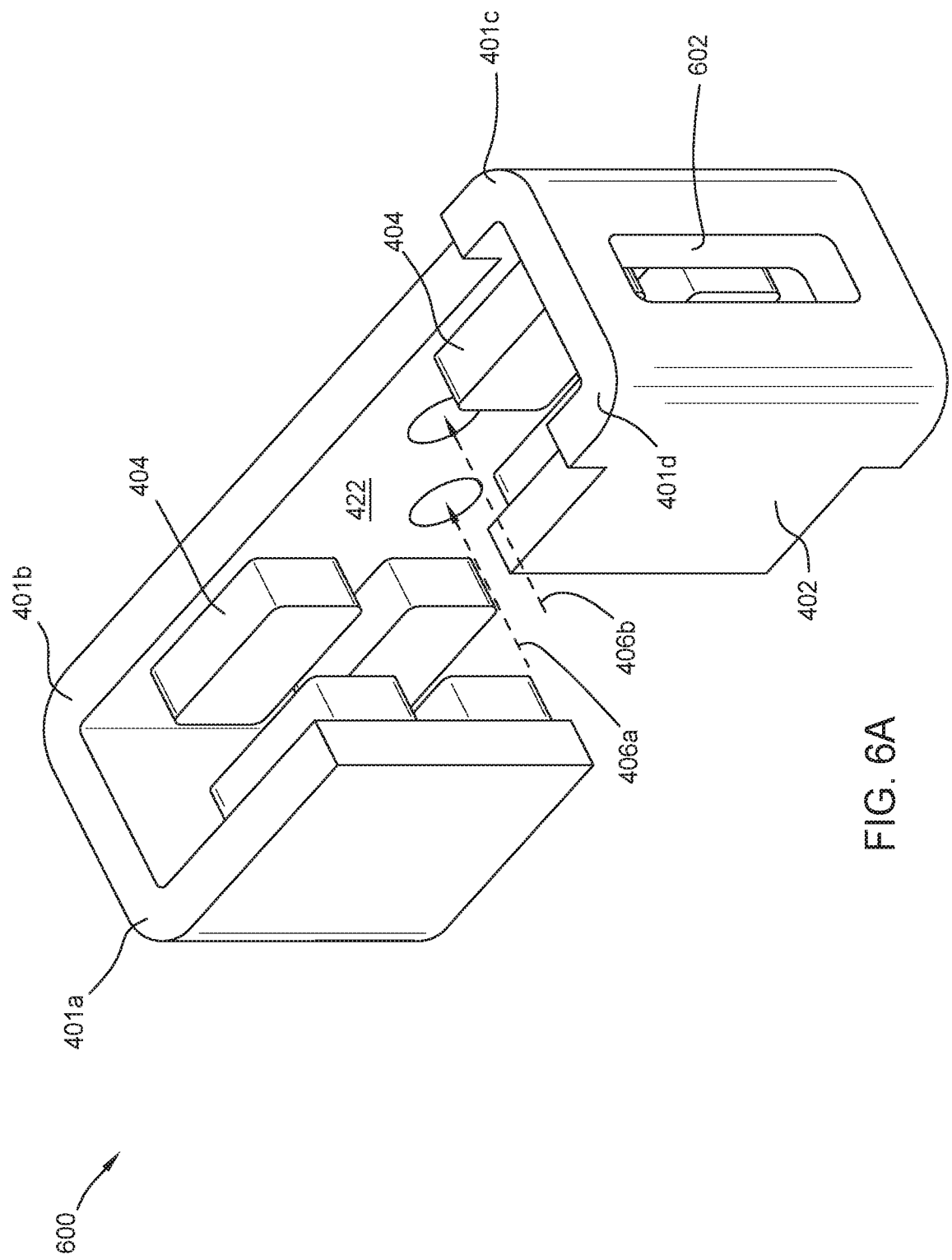

FIGS. 6A-6D are schematic illustrations of a VCM yoke 600 according to another embodiment. FIG. 6A is an isometric view of the VCM yoke 600 and shows the VCM yoke 600 having a third opening 602 formed therethrough between the third location 401c and the fourth location 401d.

Figure 6B:
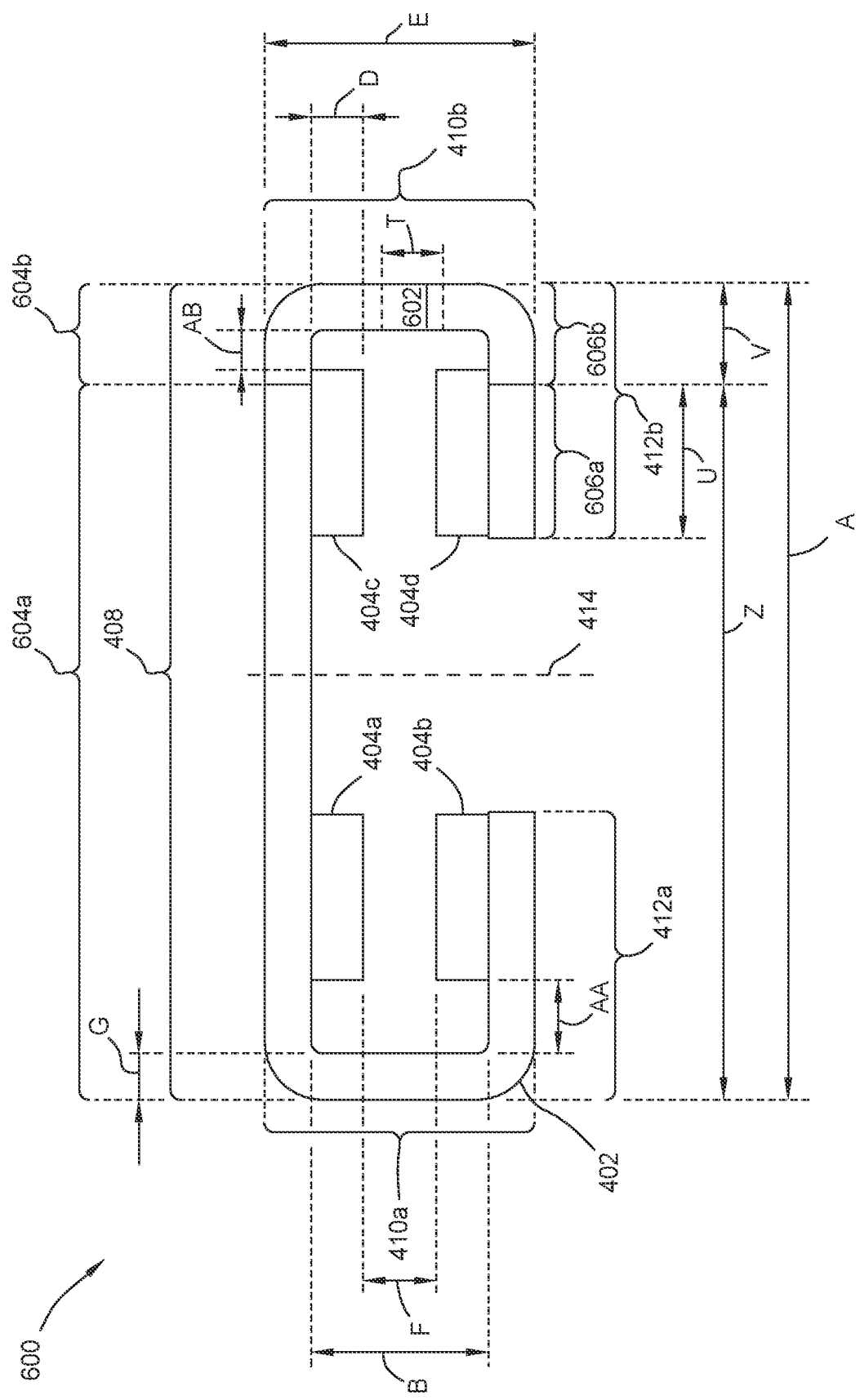

FIG. 6B illustrates a side view of the VCM yoke 600 that includes the unitary body having the third opening 602. The third opening 602 has a length "T" of between about 2 mm and about 3 mm. The third opening 602 length may be substantially less than the length "E" and the length "F", as previously described. The third opening 602 may be disposed in any position along the second arm portion 410b. Also, it is to be understood that while the opening is shown along the second arm portion 410b, it is contemplated that the opening 602 may be disposed along the first arm portion 410a instead.

The backbone portion 408 further includes a first backbone section 604a and a second backbone section 604b. The first backbone section 604a has a length "Z" of between about 27 mm and about 28 mm. Furthermore, the second hand portion 412b, defined between the second edge 614 and line 608b, further includes a first section 606a of the second hand portion 412b and a second section 606b of the second hand portion 412b. The second backbone portion 604b is coupled to the second arm portion 410b and the second arm portion 410b is coupled to the second section 606b of the second hand portion 412b. The second backbone section 604b and the second section 606b of the second hand portion 412b each has a length "V" of between about 4 mm and about 5 mm. The first section 606a of the second hand portion 412b has a length "U" of between about 5 mm and about 6 mm. The length "R*" (shown in FIG. 6D) of the second hand portion 412b includes the length "U" and the length "V", where the length "R*" has a length of between about 9 mm and about 10 mm. Furthermore, the length "R*" has a length that is substantially less than the length "R", defined between the first arm portion 410a and the line 608a.

The first and second magnets 404a, 404b each are spaced from the first arm portion 410a by a distance "AA" of between about 2 mm and about 3 mm as measured from the magnet edge closest to the first arm portion 410a to the first arm portion 410a. The third and fourth magnets 404c, 404d each are spaced from the second arm portion 410b by a distance "AB" of between about 1 mm and about 2 mm as measured from the edge closest to the second arm portion 410b to the second arm portion 410b. The distance "AA" may be substantially greater than the distance "AB".

Figure 6C:
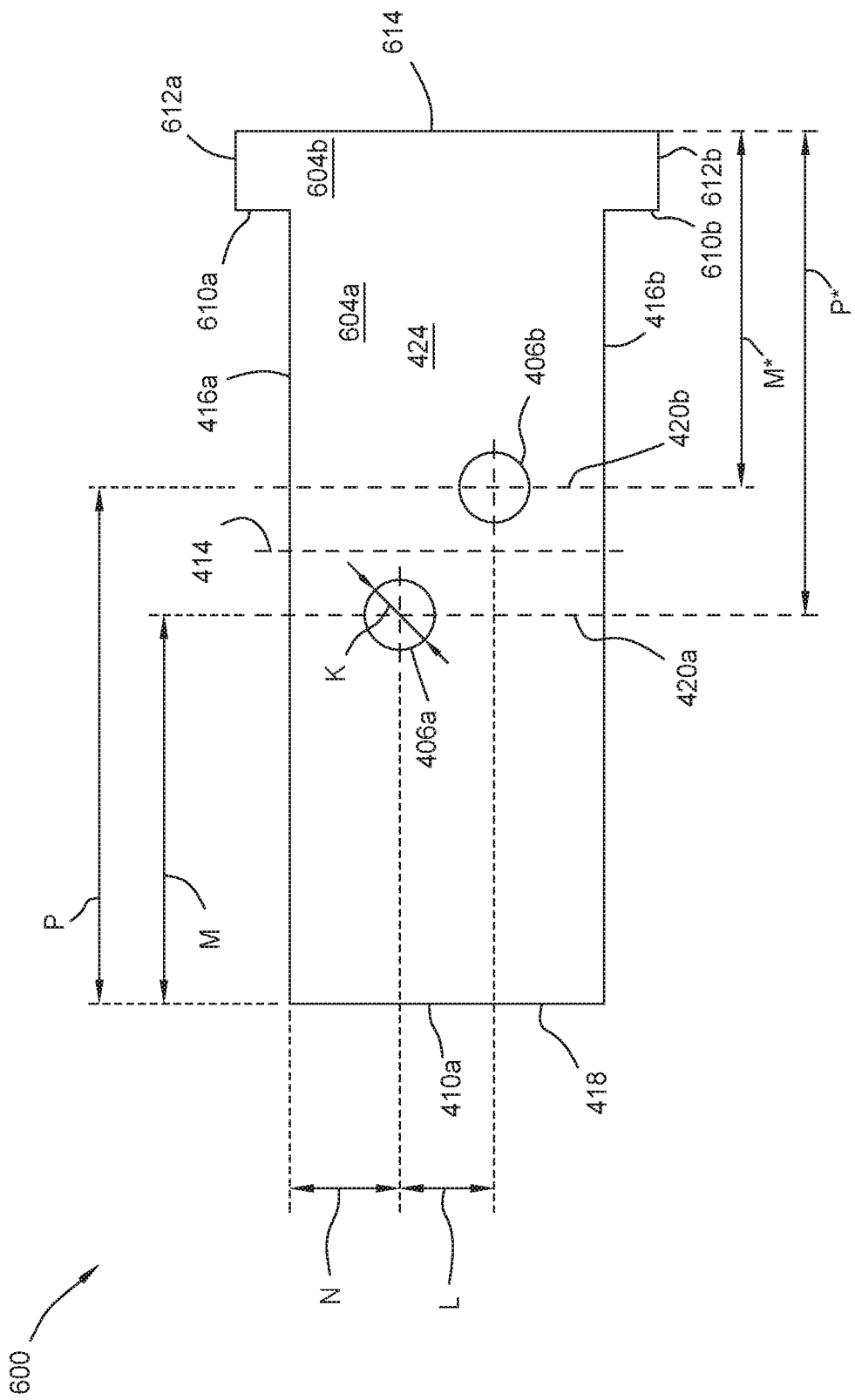

FIG. 6C illustrates a view of a back surface 424 of the backbone portion 408. FIG. 6D illustrates a view of the front surface of the backbone portion 408, the first hand portion 412a, and the second hand portion 412 that includes the first section 606a and the second section 606b of the second hand portion 412b. The top edge 416a is coupled to a first body extension edge 610a and the bottom edge 416 is coupled to a second body extension edge 610b, where the first body extension edge 610a and the second body extension edge 610b have a length "Y" of between about 1 mm and about 2 mm. In some embodiments, the first body extension edge 610a and the second body extension edge 610b have different lengths. A third body extension edge 612a and the fourth body extension edge 612b each has length "V", where the third body extension edge 612a is coupled to the first body extension edge 610a and the second edge 614, and where the fourth body extension edge 612b is coupled to the second body extension edge 610a and the second edge 614.

The second arm portion 410b, the second backbone section 604b, and the second section 606b of the second hand portion 412b each has a second height "J*" of between about 14 mm and about 15 mm. The second height "J*" is substantially greater than the height "J". In one embodiment, the unitary body 402 has a first height "J" and a second height "J*".

Furthermore, the third opening 602 has a third height "W" of between about 9 mm and about 11 mm. The third height "W" is substantially less than the first height "J" and the second height "J*". The third opening 602 has a thickness "G", where the thickness "G" is the thickness of the unitary body 402.

The center of the first opening is 406a is disposed a distance "P*" from the edge 614 of the unitary body 402 of between about 17 mm and about 18 mm. The distance "P*" has a distance that is substantially less than the distance "P". The center of the second opening 406b is disposed a distance of about "M*" from the edge 614 of the unitary body 402 of between about 12 mm and about 13 mm. The distance "M*" has a distance that is substantially less than the distance "M".

The VCM yoke 600 may be described as an asymmetrical VCM yoke as the distance "AA" is different from the distance "AB" and the height "J" is different from the height "J*". The second hand portion 412b of the VCM yoke 600 may be shorter than the second hand portion 412b of the VCM yoke 400 in order to accommodate for a stepping motor, such as the stepping motor 120, of FIG. 1. However, by decreasing the length of the backbone portion 408 and the second hand portion 412b of the VCM yoke 600, the shorter side (i.e., the side including the shortened second hand portion 412b) of the VCM yoke 600 may interfere with the VCM coil of the VCM, such as the VCM 125 of FIG. 1. Thus, by including the third opening 602 to the second arm portion 410b, the potential for interference between the VCM yoke 600 and the VCM coil during operation may be effectively decreased. The additional height of the second height "J*" may be utilized to adjust the magnetic property of the VCM yoke 600 in order to maintain equal magnetic performance between a first set of magnets that includes first and the second magnets 404a, 404b and a second set of magnets that includes the third and fourth magnets 404c, 404d.

Figure 7A:
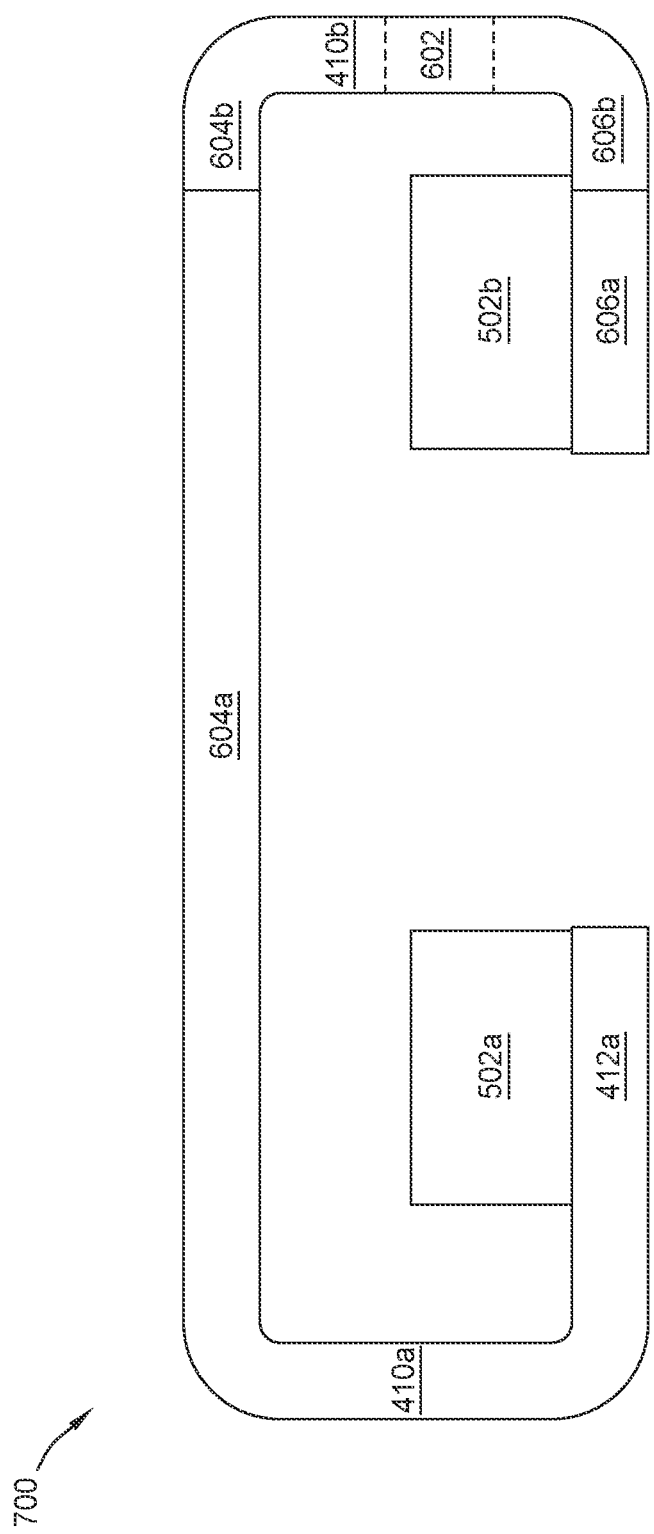
FIGS. 7A and 7B are schematic illustrations of a VCM yoke according to another embodiment.
Figure 7B:
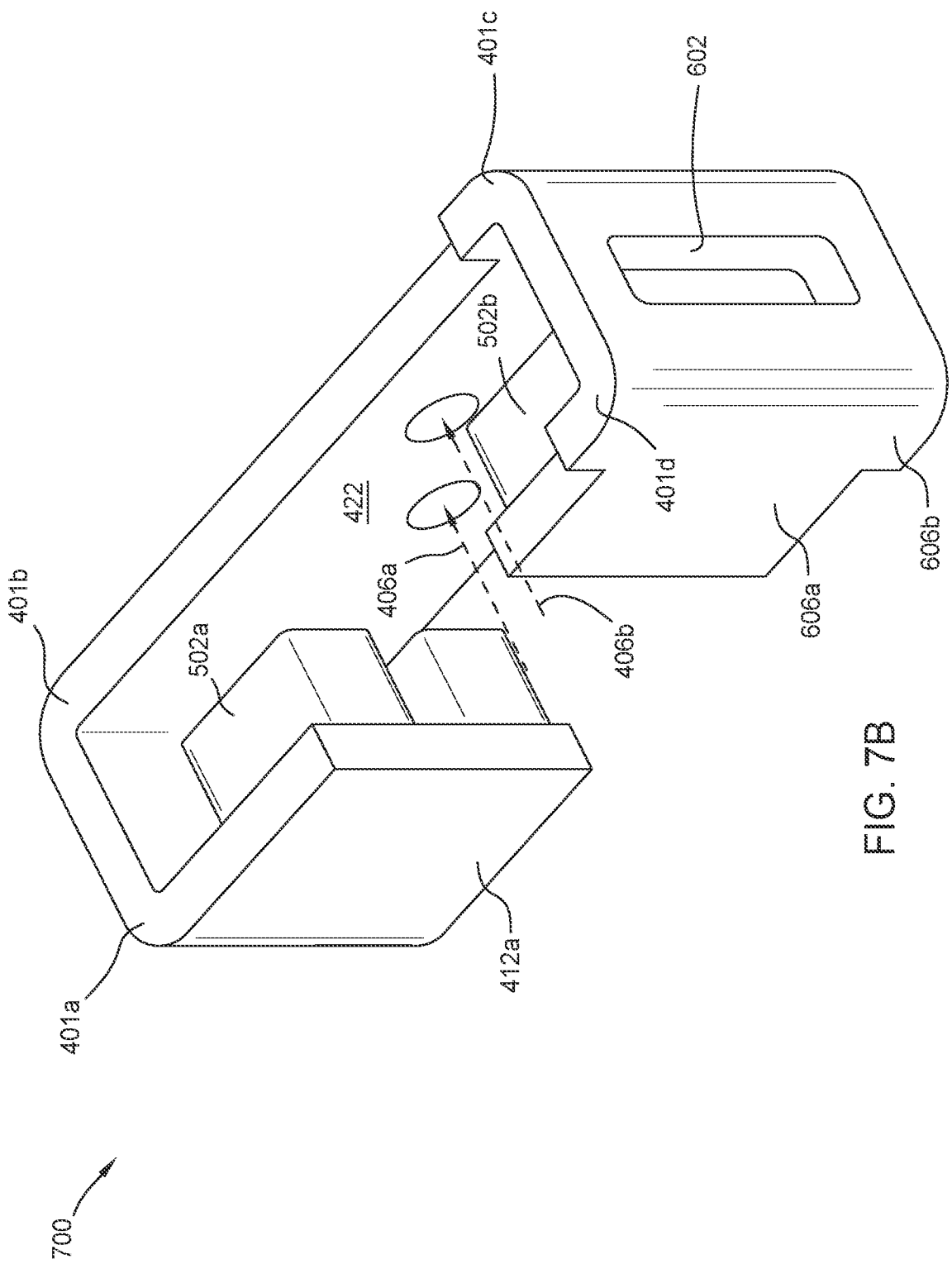

FIGS. 7A and 7B are schematic illustrations of a VCM yoke 700 according to another embodiment. In the embodiment of FIGS. 7A and 7B, rather than having magnets 404a-404d on the backbone portion 408 and the hand portions 412a, 412b, magnets 502a, 502b are disposed on either the hand portions 412a, 606a, the backbone portion 408 (depicted as backbone sections 604a and 604b), or a mixture thereof. Furthermore, the magnet 502b may be partially disposed on both the first section 606a and the second section 606b of the second hand portion 412b. Exemplified in FIGS. 7A and 7B is the embodiment where the magnets 502a, 502b are disposed on the hand portions 412a, 606a, 606b, but it is to be understood that rather than on the hand portions 412a, 606a, 606b, the magnets 502a, 502b may be on the backbone portion 408 or one magnet on the backbone portion 408 and one on either of the hand portions 412a, 606a, 606b.

By using a unitary body that turns in on itself from both ends, a VCM yoks can be fabricated for data storage devices that can accommodate changing data storage device internal component space allocation.

In one embodiment, a voice coil motor (VCM) yoke assembly comprises: a unitary body including a backbone portion, a first arm portion coupled to the backbone portion, a first hand portion coupled to the first arm portion, a second arm portion coupled to the backbone portion, and a second hand portion coupled to the second arm portion, wherein the backbone portion has one or more openings formed therethrough, wherein the first arm portion extends substantially perpendicular from the backbone portion, wherein the first hand portion extends substantially perpendicular from the first arm portion, wherein the second arm portion is substantially parallel to the first arm portion, and wherein the second hand portion is substantially parallel to the first hand portion; and a plurality of magnets coupled to the unitary body. The first hand portion and the second hand portion are disposed within a common plane when viewed from a top view. The one or more openings comprises two openings. The two openings each has a diameter of between about 2 mm and about 3.5 mm. A center of the two openings is spaced apart by a distance of between about 4 mm and about 5 mm. The backbone portion includes a top surface, a bottom surface, a front surface coupled between the top surface and the bottom surface, and a back surface coupled between the top surface and the bottom surface, wherein the two openings extend from the front surface to the back surface, wherein a first opening of the two openings is spaced a first distance from the top surface, wherein the second opening of the two openings is spaced a second distance from the top surface, and wherein the first distance is less than the second distance. The first arm has a first length, wherein the second arm has a second length, and wherein the first length is substantially equal to the second length. At least a first magnet of the plurality of magnets is coupled to the backbone portion, wherein at least a second magnetic is coupled to the first hand portion. At least a first magnet of the plurality of magnets is coupled to the first hand portion, wherein at least a second magnet is coupled to the second hand portion. The first arm has a length of between about 11 mm and about 12 mm, wherein the unitary body has a thickness of between about 1.5 mm and about 2.5 mm, wherein the first hand is spaced from the second hand by a distance of between about 10 mm and about 11 mm. The backbone portion has a length of between about 32 mm and about 35 mm. The plurality of magnets comprises eight magnets. The first arm portion and the second arm portion have different heights. The arm portion with the greatest height has an opening therethrough. At least one of the first arm portion and the second arm portion have an opening therethrough. A data storage device comprising the yoke assembly is also contemplated. The data storage device is a tape drive.

In another embodiment, a voice coil motor (VCM) yoke assembly comprises: a unitary body having a "C" shape when viewed from a top view; and a plurality of magnets coupled to the unitary body. the unitary body further comprises: a backbone portion; a first arm portion coupled to the backbone portion, wherein the first arm portion has a first height; and a second arm portion coupled to the backbone portion, wherein the second arm portion has a second height, and wherein at least one of the first arm portion and the second arm portion has an opening therethrough. The first height is greater than the second height. The opening is disposed through the first arm portion. A data storage device comprising the yoke assembly is also contemplated. The data storage device is a tape drive.

In another embodiment, a voice coil motor (VCM) yoke assembly comprises: a unitary body having four bends, wherein the four bends are all in a same direction, wherein ends of the unitary body are aligned in a common plane when viewed from a top view, and wherein the ends of the unitary body are spaced apart by an end distance; and at least four magnets coupled to the unitary body, wherein a first magnet and a second magnet of the at least four magnets are linearly aligned when viewed from the top view, wherein a third magnet and a fourth magnet of the at least four magnets are linearly aligned when viewed from the top view, wherein the first magnet and the third magnet are linearly aligned when viewed from the top view, wherein the second magnet and the fourth magnet at linearly aligned when viewed from the top view, wherein the first magnet is spaced from the second magnet by a first distance, wherein the third magnet and the fourth magnet are spaced apart by a second distance, wherein the second distance is substantially equal to the first distance and the end distance. The unitary body has a non-uniform height. A data storage device comprising the yoke assembly is also contemplated. The data storage device is a tape drive.

While the foregoing is directed to embodiments of the present disclosure, other and further embodiments of the disclosure may be devised without departing from the basic scope thereof, and the scope thereof is determined by the claims that follow.

What is claimed is:

1. A voice coil motor (VCM) yoke assembly, comprising:
a unitary body having a "C" shape when viewed from a top view, the unitary body comprising:
a backbone portion, a first arm portion coupled to the backbone portion,
a first hand portion coupled to the first arm portion;
a second arm portion coupled to the backbone portion; and
a second hand portion coupled to the second arm portion, wherein at least one of the first arm portion and the second arm portion has an opening therethrough; and
a plurality of magnets coupled to the unitary body, wherein at least two magnets of the plurality of magnets are coupled to the first hand portion.

2. The yoke assembly of claim 1, wherein the first arm portion has a first height, and wherein the second arm portion has a second height.

3. The yoke assembly of claim 2, wherein the first height is greater than the second height.

4. The yoke assembly of claim 3, wherein the opening is disposed through the first arm portion.

5. A data storage device comprising the yoke assembly of claim 1.

6. A voice coil motor (VCM) yoke assembly, comprising:
a unitary body including:
a backbone portion,
a first arm portion coupled to the backbone portion,
a first hand portion coupled to the first arm portion,
a second arm portion coupled to the backbone portion, and
a second hand portion coupled to the second arm portion,
wherein the backbone portion has one or more openings formed therethrough,
wherein the first arm portion extends substantially perpendicular from the backbone portion,
wherein the first hand portion extends substantially perpendicular from the first arm portion,
wherein the second arm portion is substantially parallel to the first arm portion, and
wherein the second hand portion is substantially parallel to the first hand portion; and
a plurality of magnets coupled to the unitary body.

7. The yoke assembly of claim 6, wherein the first hand portion and the second hand portion are disposed within a common plane when viewed from a top view.

8. The yoke assembly of claim 6, wherein the one or more openings comprises two openings.

9. The yoke assembly of claim 8, wherein the backbone portion includes a top surface, a bottom surface, a front surface coupled between the top surface and the bottom surface, and a back surface coupled between the top surface and the bottom surface, wherein the two openings extend from the front surface to the back surface, wherein a first opening of the two openings is spaced a first distance from the top surface, wherein a second opening of the two openings is spaced a second distance from the top surface, and wherein the first distance is less than the second distance.

10. The yoke assembly of claim 6, wherein the first arm has a first length, wherein the second arm has a second length, and wherein the first length is substantially equal to the second length.

11. The yoke assembly of claim 6, wherein at least a first magnet of the plurality of magnets is coupled to the backbone portion, wherein at least a second magnet is coupled to the first hand portion.

12. The yoke assembly of claim 6, wherein at least a first magnet of the plurality of magnets is coupled to the first hand portion, wherein at least a second magnet is coupled to the second hand portion.

13. The yoke assembly of claim 6, wherein the plurality of magnets comprises eight magnets.

14. The yoke assembly of claim 6, wherein the first arm portion and the second arm portion have different heights.

15. The yoke assembly of claim 14, wherein the arm portion with the greatest height has an opening therethrough.

16. The yoke assembly of claim 6, wherein at least one of the first arm portion and the second arm portion have an opening therethrough.

17. A data storage device comprising the yoke assembly of claim 6.

18. A voice coil motor (VCM) yoke assembly, comprising:
a unitary body having four bends, wherein the four bends are all in a same direction, wherein ends of the unitary body are aligned in a common plane when viewed from a top view, and wherein the ends of the unitary body are spaced apart by an end distance; and
at least four magnets coupled to the unitary body, wherein:
a first magnet and a second magnet of the at least four magnets are linearly aligned when viewed from the top view,
a third magnet and a fourth magnet of the at least four magnets are linearly aligned when viewed from the top view,
the first magnet and the third magnet are linearly aligned when viewed from the top view,
the second magnet and the fourth magnet at linearly aligned when viewed from the top view,
the first magnet is spaced from the second magnet by a first distance,
the third magnet and the fourth magnet are spaced apart by a second distance,
the second distance is substantially equal to the first distance and the end distance,
the first magnet is spaced from the third magnetic a third distance, and
the second magnet is spaced from the fourth magnetic a fourth distance.

19. The yoke assembly of claim 18, wherein the unitary body has a non-uniform height.

20. A data storage device comprising the yoke assembly of claim 18.

* * * * *